May 29, 1962

W. G. TALBOTT 3,036,682

CLUTCH RELEASE ASSEMBLY

Filed Feb. 21, 1958

Fig.1

Fig.2

Inventor:
William G. Talbott
By: Francis T. Drumm   Atty sides 3,036,682
Patented May 29, 1962

3,036,682
CLUTCH RELEASE ASSEMBLY
William G. Talbott, Rockford, Ill., assignor to Borg-Warner Corporation, Chicago, Ill., a corporation of Illinois
Filed Feb. 21, 1958, Ser. No. 716,778
1 Claim. (Cl. 192—98)

This invention relates to release bearings for clutches and more particularly to a release assembly for a plate clutch of the over-center type.

Heretofore, clutch release assemblies of this type have included an axially movable sleeve, of cast iron or the like, having an integral radially outwardly extending flange which is embraced by a bronze bearing cap or housing of channel cross section conventionally constructed of several pieces secured each to the other by bolts and nuts. The bearing is fixed against rotation but is movable axially for movement of the sleeve in one direction or the other for engagement or disengagement of the clutch plates as desired. A disadvantage of this arrangement has been the amount of friction developed between the release bearing and the flange of the sleeve, which, as will be appreciated, rotates when the clutch is engaged.

A primary object of the invention is, therefore, to provide a clutch release assembly provided with a thrust bearing which is relatively free from friction.

Another object of the invention is to provide a clutch release assembly of the stated type in which thrust bearings are interposed between the bearing cap or housing and the release sleeve to minimize friction therebetween.

A further object of the invention is to provide a clutch release assembly having a sleeve provided at one end with a reduced portion forming a shoulder, in which a thrust bearing is mounted on the reduced portion in abutment with the shoulder, wherein the bearing cap or housing is disposed in surrounding relation to the thrust bearing and wherein means are provided for retaining the thrust bearing in abutment with the shoulder of the sleeve.

A more particular object of the invention is to provide a clutch release assembly of the stated type wherein the cap or housing may be formed of relatively inexpensive metal such as cast iron or the like and wherein the thrust bearing is characterized by a pair of axially spaced races having a plurality of radially disposed needle bearings arranged therebetween.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is a vertical elevational fragmentary view of a clutch embodying a release assembly made in accordance with the present invention and taken substantially on line 1—1 of FIGURE 2; and FIGURE 2 is a reduced end view taken as viewed from the right in FIGURE 1 along line 2—2 of that figure.

With reference to the drawings and more particularly to FIGURE 1, the clutch release assembly of the present invention is indicated generally by reference numeral 10 and is shown in conjunction with a clutch of the over-center type indicated generally by reference numeral 12.

The clutch 12 is illustrated fragmentarily and is shown as including an axially slidable pressure plate 14 and a backing plate 20 which is splined at 26 to a sleeve 28. The sleeve 28 has a splined bore 30 for reception of an input shaft 16 (shown in dot-and-dash lines). Between the plate 14 and the plate 20 is an output sheave 18. The plates 14 and 20 are provided with friction facings 22 and 24 respectively for engaging the sheave 18 to effect a driving connection between the plates 14 and 20 and the sleeve 18. The sleeve 28 is maintained in a fixed axial relation to the shaft 16 by a set screw 33. A bushing 35, of oilite or the like, is interposed between the sheave 18 and the sleeve 28.

The clutch 12 is shown in engaged position in FIGURE 1. This engaged relation may be terminated by the release assembly 10 which is shown as being of the over-center type. The release bearing 10 includes an axially slidable sleeve 34, of cast iron or the like, to which is attached a plurality of over-center lever assemblies 36. Each of the lever assemblies 36 includes a standard 38 extending radially outwardly from an adjusting ring 40 threadedly received on the input sleeve 28 and securable in any desired axial position by means of a set screw 42. The outer ends of the standards 38 are shown as being arcuate in cross section and each has a bore 43 for reception of a pin 44. In addition, each of the standards 38 has a radially extending slot 46 through which passes a pair of bell cranks 48 which are pivoted about the pin 44. Each of the bell cranks 48 is apertured at one end for reception of a pin 50 extending therebetween and supporting a roller 52 which engages the adjacent side of the plate 14. At the other end of the bell cranks 48 are registering apertures 54 for reception of a link pin 56 which, as shown in FIGURE 2, is retained in position by means of a retaining ring 58. By this arrangement, the bell cranks 48 may be pivoted in unison about the axis of the pin 44 in a manner that will now be described.

Pivoting of the bell cranks 48, in the present instance, may be effected by means of an arm 59, one for each of the over-center lever assemblies 36. Each arm 59 is radially offset from and integral with the sleeve 34 and extends axially thereto towards the plate 14. At the inner surface of each of the arms 59 is a radially outwardly extending recess 60 in which the pin 56 of the overcenter lever assembly 36 is received.

The clutch 12 may be moved from the position shown in FIGURE 1 to the disengaged position by the release assembly 10 which, as shown in FIGURE 2, includes a thrust bearing assembly 57 provided with a pair of trunnions 62. The trunnions 62 are engaged by a yoke 64 which is actuated by transversely extending shaft 66 in conventional fashion. According to the present invention, the sleeve 34 of the release assembly is provided with a first reduced portion 68 defining a shoulder 70 and a second reduced portion 72 defining a shoulder 74. A thrust bearing 76 forming a part of the thrust bearing assembly 57 is mounted on the reduced portion 68 and is retained in abutment with the shoulder 70 by means of a retaining ring 78 received in a peripheral groove 80 adjacent the shoulder 74. The thrust bearing 76 includes annular races 82 and 84 between which are disposed a plurality of radially extending bearing needles 86. Surrounding the thrust bearing 76 and forming a part of the bearing assembly 57 is a bearing cap or housing 88 which is preferably bipartite in construction and held in assembled relation by bolts 90 and elastic stop nuts 91. The thrust bearing 76 is received within an annular groove 92 extending radially outwardly from the inner periphery of the housing 88.

It will be appreciated that the bell cranks 48 are in the center position when the axis of the associated pin 56 is in the same axial plane as the axis of the pin 44. As the arms 59 are moved to the left, as viewed in FIGURE 1, during the course of engagement, the pins 56 travel past the center position. Thus each roller 52 urges the plate 14 further to the left, as viewed in FIGURE 1, then required to effect connective engagement. Further pivotal movement in the same direction urges the bell cranks to the engaged position shown. Positive movement of the release assembly 10 is required to effect disengagement.

The clutch release assembly above-described exhibits important advantages over known release bearing arrangements, particularly in connection with clutches of the over-center type. In the over-center type clutch the axial forces exerted on the sleeve of the release assembly are considerable, and, consequently, wear of the bearing cap or housing has been excessive. The thrust bearing assembly of the present invention, however, obviates the disadvantages of prior constructions and has been found to be usable even after repeated actuations of the clutch release assembly.

While I have described my invention in connection with certain specific constructions and arrangements, it is to be understood that this is by way of illustration and not by way of limitation and the scope of my invention is defined solely by the appended claim which should be construed as broadly as the prior art will permit.

I claim:

A clutch release assembly comprising an axially adjustable ring, a plurality of circumferentially spaced lever assemblies mounted on said ring and adapted to engage a pressure plate of the clutch, said lever assemblies each comprising a pivotal arm having means at its outer end to engage said pressure plate, said arm operating to apply pressure by slightly over-centering the span between its pivot and the pressure plate, a rotatable sleeve slidable axially to actuate said lever assemblies, and anti-friction means for effecting the sliding movement of said sleeve, said anti-friction means including a thrust bearing assembly axially fixed with respect to said sleeve, said thrust bearing assembly including a substantially annular housing having an annular groove extending radially outwardly from the inner periphery thereof with oppositely facing side walls and a thrust bearing received in said groove, said thrust bearing including a pair of axially spaced annular races having a plurality of radially extending bearing needles therebetween, each said race having an outwardly facing surface with a major proportion thereof in engagement with one of the oppositely facing side walls of said groove.

References Cited in the file of this patent

UNITED STATES PATENTS

| | | |
|---|---|---|
| 1,339,801 | White | May 11, 1920 |
| 1,684,012 | Dennison | Sept. 11, 1928 |
| 1,864,126 | Ferris | June 21, 1932 |
| 2,168,960 | Morris | Aug. 8, 1939 |
| 2,218,368 | Wagner | Oct. 15, 1940 |
| 2,251,366 | Miller et al. | Aug. 5, 1941 |
| 2,540,548 | Rolph | Feb. 6, 1951 |
| 2,665,112 | Ashton | Jan. 5, 1954 |
| 2,708,497 | Parrett | May 17, 1955 |

FOREIGN PATENTS

| | | |
|---|---|---|
| 681,376 | Germany | Sept. 21, 1939 |